(12) United States Patent
Sterling et al.

(10) Patent No.: US 12,387,233 B2
(45) Date of Patent: *Aug. 12, 2025

(54) SYSTEMS AND METHODS FOR CAPTURING ACCOUNT HOLDER CONSENT FOR TRANSACTION DATA COLLECTION

(71) Applicant: Worldpay, LLC, Symmes Township, OH (US)

(72) Inventors: Jacob Matthew Sterling, Creve Coeur, MO (US); Scott Wayne DeAngelo, Mason, OH (US); Dennis A. Kettler, Mason, OH (US); Balaji Janakiraman Iyer, Aurora, IL (US); Trevor Alan Bass, Cambridge, MA (US)

(73) Assignee: Worldpay, LLC, Symmes Township, OH (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/526,135

(22) Filed: Dec. 1, 2023

(65) Prior Publication Data

US 2024/0104596 A1    Mar. 28, 2024

Related U.S. Application Data

(63) Continuation of application No. 16/932,457, filed on Jul. 17, 2020, now Pat. No. 11,875,373, which is a (Continued)

(51) Int. Cl.
*G06Q 20/02* (2012.01)
*G06Q 30/0201* (2023.01)
*G06Q 30/0207* (2023.01)

(52) U.S. Cl.
CPC ..... *G06Q 30/0222* (2013.01); *G06Q 30/0201* (2013.01)

(58) Field of Classification Search
CPC ................ G06Q 30/0222; G06Q 30/0201
See application file for complete search history.

(56) References Cited

U.S. PATENT DOCUMENTS 8,548,848 B1    10/2013  Shaw et al.
9,747,608 B2    8/2017   Ortiz et al.
(Continued)

OTHER PUBLICATIONS

Fatema et al. Compliance through informed consent: semantic based consent permission and data management model. ISWC 2017. Trinity College, Dublin. (Year: 2017).*
(Continued)

*Primary Examiner* — Waseem Ashraf
*Assistant Examiner* — Christopher C Busch
(74) *Attorney, Agent, or Firm* — Bookoff McAndrews, PLLC

(57) ABSTRACT

Systems and methods are disclosed for providing an account holder with an incentive-consent matrix at a point-of-sale device of a merchant. The account holder can provide consent to store transaction related data and obtain an incentive in exchange. The incentive can be a coupon or other offering associated with the merchant. Varying levels of consent can be offered, with each level associated with an incentive having a different relative value. The transaction data can subsequently be provided to a recipient in accordance with the consent received from the account holder.

20 Claims, 8 Drawing Sheets

Related U.S. Application Data continuation of application No. 14/609,546, filed on Jan. 30, 2015, now Pat. No. 10,776,802.

(56) References Cited

U.S. PATENT DOCUMENTS

| | | | |
|---|---|---|---|
| 10,601,978 B2* | 3/2020 | Mosher | H04W 12/082 |
| 2003/0078877 A1* | 4/2003 | Beirne | G06Q 20/4037 |
| | | | 705/38 |
| 2012/0066126 A1 | 3/2012 | Kingston et al. | |
| 2012/0215631 A1 | 8/2012 | Walker et al. | |
| 2012/0324225 A1* | 12/2012 | Chambers | H04L 9/0891 |
| | | | 713/169 |
| 2013/0218694 A1 | 8/2013 | Kingston et al. | |
| 2014/0025391 A1 | 1/2014 | Knowles et al. | |
| 2014/0081844 A1 | 3/2014 | Hosp | |
| 2014/0149240 A1 | 5/2014 | Ansel et al. | |
| 2014/0188584 A1* | 7/2014 | Park | G06Q 30/0239 |
| | | | 705/14.39 |
| 2014/0344040 A1 | 11/2014 | Howe | |
| 2015/0046744 A1 | 2/2015 | Frerking | |
| 2015/0302536 A1 | 10/2015 | Wahl et al. | |
| 2015/0310455 A1 | 10/2015 | Vinals | |
| 2016/0019517 A1* | 1/2016 | Kirsh | G06Q 20/047 |
| | | | 705/24 |
| 2016/0050283 A1* | 2/2016 | Azose | G06F 16/9537 |
| | | | 709/203 |

OTHER PUBLICATIONS

Fatema et al Compliance through Informed Consent: Semantic Based Consent Permission and Data Management Model. ISWC 2017. Trinity College, Dubin.

* cited by examiner

SYSTEMS AND METHODS FOR CAPTURING ACCOUNT HOLDER CONSENT FOR TRANSACTION DATA COLLECTION

CROSS-REFERENCE TO RELATED APPLICATION(S)

This Patent application is a continuation of and claims the benefit of priority to U.S. application Ser. No. 16/932,457, filed on Jul. 17, 2020, which is a continuation of U.S. application Ser. No. 14/609,546, filed on Jan. 30, 2015, now U.S. Pat. No. 10,776,802, the entireties of which are incorporated herein by reference.

TECHNICAL FIELD

The systems and methods described below relate generally to the field of account holder analytics. More particularly, the systems and methods relate to the field of collecting analytics based on account holder providing consent at a point of sale.

BACKGROUND

Millions of transactions occur daily through the use of payment cards, such as credit cards, debit cards, prepaid cards, and so forth. Corresponding records of the transactions are recorded in databases for settlement and financial recordkeeping. Such data can be mined and analyzed for trends, statistics, and other analyses. Sometimes such data is mined for specific advertising goals, such as to provide targeted offers to account holders, for example. It may be desirable to receive consumer consent for the collecting and/or sharing of the data. It may also be desirable to receive account holder consent in a fast, convenient way that is not cumbersome for the account holder or a merchant.

SUMMARY

In an embodiment, the present disclosure is directed, in part, to a computer-implemented method. The computer-implement method comprises causing, by one or more computing devices associated with an acquirer processor, the presentment of a transaction data capture consent request to an account holder associated with a payment vehicle account, where the account holder is initiating a payment transaction at a point of sale device that is associated with the merchant. The transaction data capture consent request comprises an incentive associated with the merchant. The method also comprises receiving, by one or more computing devices associated with an acquirer processor, an indication of consent from the account holder associated with the payment vehicle account. The method also comprises, responsive to the indication of consent, and by one or more computing devices associated with an acquirer processor applying the incentive to the payment transaction and storing, in a transaction data database communicably coupled to one or more computing device, the transaction data. The method also comprises responsive to an analytical data request from a recipient, providing by one or more computing devices associated with an acquirer processor the transaction data to the recipient.

In an embodiment, the present disclosure is directed, in part, to a non-transitory computer readable medium having instructions stored thereon which when executed by a processor cause the processor to cause the presentment of an incentive-consent matrix to an account holder associated with a payment vehicle account, wherein the account holder is initiating a payment transaction at a point of sale device that is associated with the merchant. The incentive-consent matrix comprises at least one incentive associated with at least one level of consent. The instructions stored on the computer readable medium when executed also cause the processor to receive an indication of a level of consent from the account holder associated with the payment vehicle account. The instructions stored on the computer readable medium when executed also cause the processor to provide the incentive associated with the level of consent to the account holder responsive to the indication of the level of consent, and store in a transaction data database communicably coupled to one or more computing device, the transaction data based on the level of consent received from the cardholder. The instructions stored on the computer readable medium when executed also cause the processor to provide the transaction data to the merchant responsive to an analytical data request from the merchant.

In an embodiment, the present disclosure is directed, in part, to an acquirer computing system. The acquirer computing system comprises means for causing the presentment of an incentive-consent matrix to an account holder associated with a payment vehicle account, where the account holder is initiating a payment transaction at a point of sale device that is associated with the merchant. The incentive-consent matrix comprises at least one incentive associated with at least one level of consent. The acquirer computing system also comprises means for receiving an indication of a level of consent from the account holder associated with the payment vehicle account. The acquirer computing system also comprises means for providing the incentive associated with the level of consent to the account holder in response receiving to the indication of the level of consent, and means for storing transaction data based on the level of consent received from the cardholder. The acquirer computing system also comprises means for providing the transaction data to the merchant in response to an analytical data request from the merchant.

BRIEF DESCRIPTION OF THE DRAWINGS

It is believed that certain embodiments will be better understood from the following description taken in conjunction with the accompanying drawings, in which like references indicate similar elements and in which.

DETAILED DESCRIPTION

Figure 1:
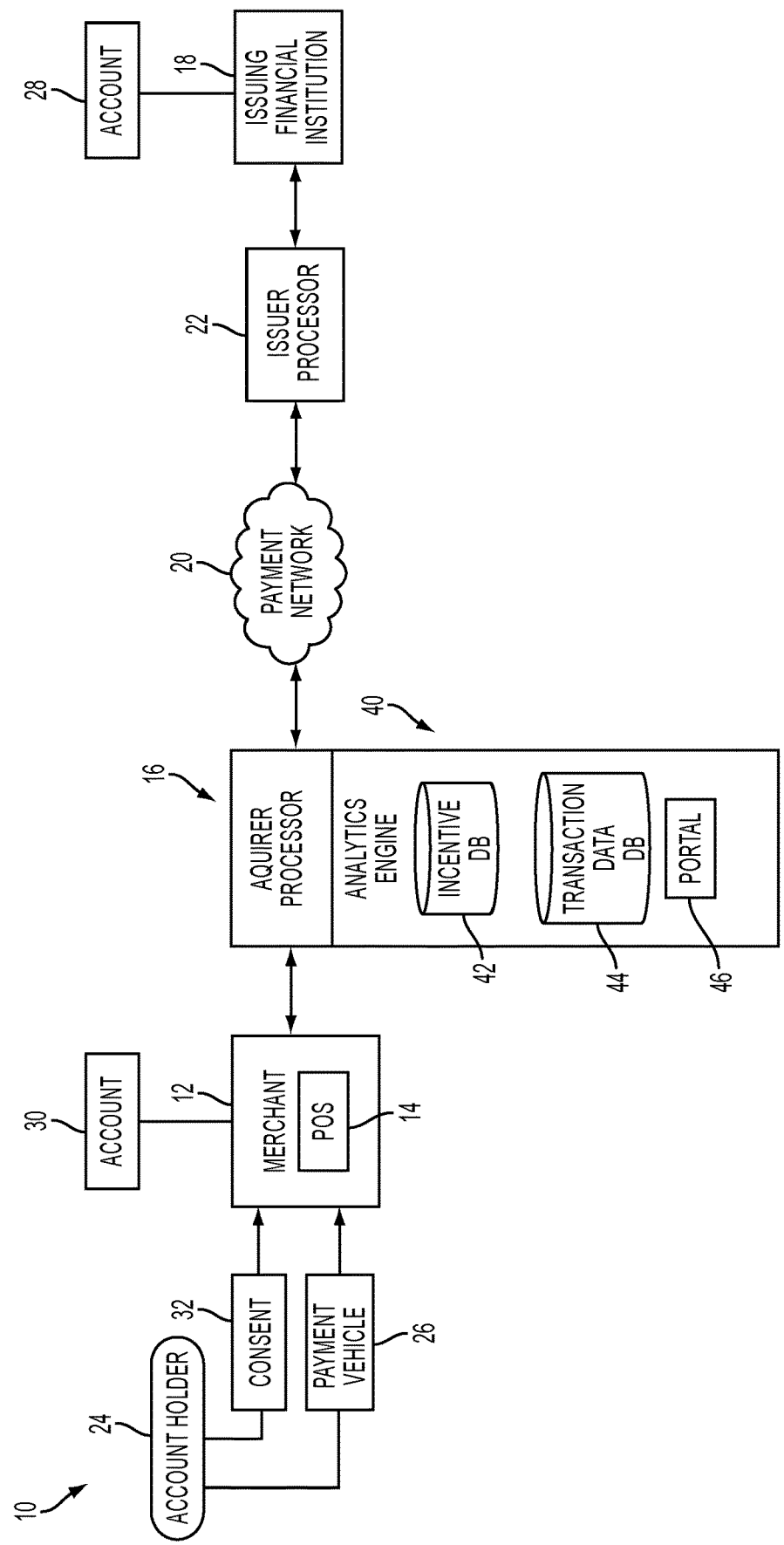
FIG. 1 depicts a system which includes a merchant that sell products and/or services and various entities within a payment ecosystem.

Various non-limiting embodiments of the present disclosure will now be described to provide an overall understanding of the principles of the structure, function, and use of systems and methods disclosed herein for the collection of account holder consent at a point of sale device. One or more examples of these non-limiting embodiments are illustrated in the selected examples disclosed and described in detail with reference made to FIGS. 1-9 in the accompanying drawings. Those of ordinary skill in the art will understand that systems and methods specifically described herein and illustrated in the accompanying drawings are non-limiting embodiments. The features illustrated or described in connection with one non-limiting embodiment may be combined with the features of other non-limiting embodiments. Such modifications and variations are intended to be included within the scope of the present disclosure.

The systems, apparatuses, devices, and methods disclosed herein are described in detail by way of examples and with reference to the figures. The examples discussed herein are examples only and are provided to assist in the explanation of the apparatuses, devices, systems and methods described herein. None of the features or components shown in the drawings or discussed below should be taken as mandatory for any specific implementation of any of these the apparatuses, devices, systems or methods unless specifically designated as mandatory. For ease of reading and clarity, certain components, modules, or methods may be described solely in connection with a specific figure. In this disclosure, any identification of specific techniques, arrangements, etc. are either related to a specific example presented or are merely a general description of such a technique, arrangement, etc. Identifications of specific details or examples are not intended to be, and should not be, construed as mandatory or limiting unless specifically designated as such. Any failure to specifically describe a combination or sub-combination of components should not be understood as an indication that any combination or sub-combination is not possible. It will be appreciated that modifications to disclosed and described examples, arrangements, configurations, components, elements, apparatuses, devices, systems, methods, etc. can be made and may be desired for a specific application. Also, for any methods described, regardless of whether the method is described in conjunction with a flow diagram, it should be understood that unless otherwise specified or required by context, any explicit or implicit ordering of steps performed in the execution of a method does not imply that those steps must be performed in the order presented but instead may be performed in a different order or in parallel.

Reference throughout the specification to "various embodiments," "some embodiments," "one embodiment," "some example embodiments," "one example embodiment," or "an embodiment" means that a particular feature, structure, or characteristic described in connection with any embodiment is included in at least one embodiment. Thus, appearances of the phrases "in various embodiments," "in some embodiments," "in one embodiment," "some example embodiments," "one example embodiment, or "in an embodiment" in places throughout the specification are not necessarily all referring to the same embodiment. Furthermore, the particular features, structures or characteristics may be combined in any suitable manner in one or more embodiments.

Throughout this disclosure, references to components or modules generally refer to items that logically can be grouped together to perform a function or group of related functions. Like reference numerals are generally intended to refer to the same or similar components. Components and modules can be implemented in software, hardware, or a combination of software and hardware. The term "software" is used expansively to include not only executable code, for example machine-executable or machine-interpretable instructions, but also data structures, data stores and computing instructions stored in any suitable electronic format, including firmware, and embedded software. The terms "information" and "data" are used expansively and includes a wide variety of electronic information, including executable code; content such as text, video data, and audio data, among others; and various codes or flags. The terms "information," "data," and "content" are sometimes used interchangeably when permitted by context. It should be noted that although for clarity and to aid in understanding some examples discussed herein might describe specific features or functions as part of a specific component or module, or as occurring at a specific layer of a computing device (for example, a hardware layer, operating system layer, or application layer), those features or functions may be implemented as part of a different component or module or operated at a different layer of a communication protocol stack. Those of ordinary skill in the art will recognize that the systems, apparatuses, devices, and methods described herein can be applied to, or easily modified for use with, other types of equipment, can use other arrangements of computing systems such as client-server distributed systems, and can use other protocols, or operate at other layers in communication protocol stacks, than are described.

For simplicity, the description that follows will be provided by reference to a "payment vehicle," which generally refers to any type of financial alternative to currency. As is to be clear to those skilled in the art, no aspect of the present disclosure is specifically limited to a specific type of payment vehicle. Therefore, it is intended that the following description encompasses the use of the present disclosure with many other forms of financial alternatives to currency, including credit cards, debit cards, smart cards, single-use cards, pre-paid cards, electronic currency (such as might be provided through a cellular telephone or personal digital assistant), and the like.

As described in more detail below, the presently disclosed systems and methods generally allow for presenting an account holder with an option to opt-in, or otherwise provide consent, for the capture and use of transaction data. The term account holder, as used herein, generally refers to the person to whom a payment vehicle is issued to, or otherwise has access to an account associated with the payment vehicle. The transaction data capture consent request can be presented, for example, on an interface of on a merchant point of sale (POS) device. The present disclosure is not limited to any particular type of POS device. As used herein, the term POS device is used broadly to include POS devices at brick and mortar locations and "virtual" POS devices that can be associated with an online retailer or "in-app" purchases. In some cases, the POS device includes a terminal, or other network computing system which may be used to facilitate a payment transaction at a merchant location.

When the account holder provides consent, transaction data associated with the transaction event can be used, for example, by one or more of a merchant, an acquirer processor, an issuer process, an issuing financial institution, and other types of third party entities, which are referred to individually or collectively herein as a "data collection entity". In some cases, the transaction data can be used for information processing/analysis, generally known as "analytics." The particular entity that has access to the transaction data can depend on the level of consent provided by the account holder, as described in more detail below. As used herein, "transaction data" refers to any type of data or information that may be useful for analytics type activities. While the transaction data collected may vary by transaction and by merchant, example transaction data can include payment vehicle information, product information including product type, product serial number, transaction amount, loyalty account information, merchant information, and so on.

The consent that is electronically received from the account holder at the POS device can have a defined scope based on various limitations, which can, in some cases, be account holder controlled. For example, the consent can be associated with a defined consent time period or expiration date. In some embodiments, the consent time period is 1 month, or less. In some embodiments, the consent time period is 4 months or less. In some embodiments, the consent time period is 6 months or less. In some embodiments, the consent time period more 6 months. After the consent time period is expired, the consent provided to the data collection entity by the account holder is revoked.

Additionally or alternatively to a time period limitation, the consent can also have a defined data scope. For instance, the consent for data collection received from the account holder can be merchant-specific data, payment vehicle-specific data, transaction-specific data, and/or other types of defined scope. The account holder can optionally determine which entity, or type of entities, can access the transaction data. By way of example, one account holder may indicate, through interactions with a POS device, that only the merchant associated with the transaction can collect and analyze their transaction data. Another account holder may provide a more expansive level of consent that provides consent to any interested party to collect and analyze their transaction data. In some embodiments, the account holder can determine if the data collection entity is permitted to share the transaction data with additional parties.

In some embodiments, in exchange for providing their consent, an account holder is offered a particular incentive. The incentive can be conveyed to the account holder, for example, by the POS device or by any other type of suitable computing device. As used herein, the term incentive is used broadly to refer to any type of coupon, discount, offering, or other type of program that is offered to an account holder in exchange for providing their consent. In some embodiments, the incentive is applied directly (i.e., in substantially real-time) to a transaction being processes by the POS device. In some embodiments, the incentive is a coupon printed by a printer associated with the POS device that can be applied to subsequent transactions. In some embodiments, the incentive is merchant-specific, whereas in other embodiments, the incentive may be merchant-agnostic. An example of a merchant-specific incentive is an offering that is only redeemable at the merchant associated with the transaction. An example of a merchant-agnostic incentive is a credit applied to an account associated with the payment vehicle or the issuing of a prepaid card to the account holder.

The type or value of incentive provided to the account holder can vary based on the level or scope of consent provided by the account holder. In some cases, the relative magnitude of the incentive is proportional to the scope of consent provided. By way of non-limiting example, a first account holder agreeing to give a merchant permission to track transaction data for a period of one month may receive a first incentive. A second account holder agreeing to give the merchant permission to track transaction data for a period of six months may receive a second incentive. A third account holder agreeing to give the merchant permission to track transaction data for a period of one year months may receive a third incentive. In this example, the relative value of the third incentive can be greater than the first incentives and the second incentive has a relative value greater than the first incentive. In this regard, the account holder is incentivized to increase the scope of their level of consent through offers having higher value.

The POS device, which can include other associated interactive devices, during a transaction event, can provide the account holder with overviews of the various levels of consent and the various levels of associated incentives. The overview can be provided in a variety of formats, which may depend on the display limitations of the POS device. In some implementations, the overview is provided as an incentive-consent matrix with varying levels of consent, each associated with a different incentive. After considering the incentive-consent matrix, the account holder can selectively determine which level of consent they are willing to give (if any), and see the corresponding incentive they will receive in return. The particular incentive-consent matrix can be established by the merchant, or any other suitable entity.

A portal can be provided for data collection entities to view or otherwise access the transaction data that has been collected based on account holder consent. As described in more detail below, in some embodiments, the portal can be maintained by an acquirer processor. In other embodiments, other entities can maintain the portal. In any event, a merchant or other party having the requisite permissions, can access the transaction data through the portal. In some embodiments, the portal is configured to deliver data files to recipients, such as in a comma-separated value ("CSV") file or a text ("TXT") file. Such data files can be delivered to a recipient based on a particular delivery schedule, such as daily, weekly, or monthly, for example. Additionally or alternatively, the data file can be delivered upon receiving a request from a recipient. In some embodiments, the portal is configured to provide a recipient with a visual dashboard of the transaction data. Such portals can be hosted by a web server allowing recipients to view the transaction data on a web browser executing on a recipient computing device. Some portals can be hosted by an application server allowing recipients to view the transaction data through a specialized application installed on a recipient computing device. The transaction data delivered to the recipient can be segmented or otherwise processed for readability purposes. The scope of the transaction data will depend, however, on the particular levels of consent received from the individual account holders included in the transaction data. Thus, the relative levels of transaction data available for individual account holders and transactions can vary within the data reporting. Some account holders can give relatively high level of permissions resulting in transaction data having a high granularity. Other account holder can give lower levels of permission resulting in transaction data having a low granularity. Similarly, the transaction data provided to a recipient can be merchant specific or comprise transaction data across a plurality of merchants.

Referring now to FIG. 1, a system is shown, generally designated 10, which includes a merchant 12 (only one shown for clarity) that sell products and/or services as well as other example entities in an example payment ecosystem. Various entities which may also be part of the payment ecosystem, such as various types of gateways or other service providers, are not included in FIG. 1 for clarity. Further, it is to be appreciated that the merchant 12 can be any type of merchant, such as a brick-and-mortar merchant, an online merchant, a mobile merchant, a kiosk, or any other type of merchant or device configured to receive payment cards from account holders as a form of payment. Within each merchant 12 can be one or more point of sale (POS) devices, sometimes referred to as credit card readers, or other consumer input devices (only one POS device 14 is shown) for reading payment card information from payment cards that are swiped, or otherwise entered into the POS device 14. For an online or virtual merchant 12, for example, the POS device 14 can comprises an online interface through which a payment card number can be provided (i.e., typed by the account holder). Thus, the POS device 14 can be any type of device, physical or virtual, used by the merchant 12 to communicate payment-related information to an acquirer processor 16. As is to be appreciated, the POS device 14 can directly send the transaction data to the acquirer processor 16 or indirectly send transaction data through gateways or other payment processing platforms.

Generally, the acquirer processor 16, sometimes referred to as an acquiring bank or simply an acquirer, can refer to any entity, or collection of entities, that processes credit, debit, and other payment card transactions originating at the merchant 12. The acquirer processor 16 generally accepts or acquires payment card payment from issuing financial institutions within an association. Examples of credit card associations are VISA, MASTERCARD, DISCOVER, AMERICAN EXPRESS, and Diners Club. Upon receiving an authorization request, or other type of messaging from the POS device 14, the acquirer processor 16 can send appropriate messaging through a payment network 20 to an issuer processor 22 of an issuing financial institution 18. As is known in the art, the payment network 20 can be affiliated with one of the credit card associations mentioned above. Additionally, depending on the type of payment vehicle used at the POS device 14, the acquirer processor 16 may utilize different types of messaging to process the transaction. For example, gift cards (i.e., closed loop cards) may be processed differently than credit cards (i.e., open-loop cards). In any event, the consent for transaction data capture can be obtained in accordance with the presently disclosed system and methods without regard to the particular type of payment vehicle used for the transaction.

Still referring to FIG. 1, an account holder 24 that is associated with a payment vehicle 26 can interact with the POS device 14 during a transaction event that effectuates the transfer of funds from an account 28 associated with the payment vehicle 26 to an account 30 associated with the merchant 30. The transaction event can occur at a brick and mortar merchant, on a website, at an unattended kiosk, or any other environment configured to receive payment vehicle-based transactions. The payment vehicle 26 illustrated in FIG. 1 can be, for example, an open-loop card that is issued to the account holder 24 (such as by the issuing financial institution 18) or a closed-loop card (such as a gift card redeemable at the merchant 12) that the account holder 24 controls.

During the transaction event at the POS device 14, the account holder 24 can be presented with a transaction data capture consent request. In some embodiments, the transaction data capture consent request is graphically presented on a visual display of the POS device 14. In other embodiments, the transaction data capture consent request is presented to a sales clerk on a terminal and the sales clerk conveys the transaction data capture consent request to the account holder orally. The transaction data capture consent request can be presented as incentive-consent matrix. Generally, an incentive-consent matrix conveys varying scopes of transaction data capturing with varying levels (i.e. values) of incentives. The incentive-consent matrix can be displayed to the account holder 24 in its totality, or portions of the incentive-consent matrix can be sequentially displayed. As is to be appreciated, the particular display capability of the POS device 14, or other device displaying the incentive-consent matrix, may determine the particular arrangement of the incentive-consent matrix.

In one embodiment, increasing the scope of the transaction data that is captured increases the incentive or groups of incentives that are offered to the account holder 24. The POS device 14, other display screen associated with the merchant 12, can display the various levels of consent and the particular incentive(s) associated with each level. Through interactions with the POS device 14, the account holder can optionally select a particular level of consent to receive the indicated incentive. Upon selection of a particular incentive, the incentive can be applied to the transaction instigated by the payment vehicle 26 (i.e., in substantially real-time) or otherwise provided to the account holder 24. In some embodiments, for example, the selection of a particular incentive is provided to a merchant computing system which e-mails, or otherwise electronically sends, an incentive to the account holder. Additionally or alternatively, a coupon can be printed by a printer associated with the POS device 14. The selection of a particular incentive can also be provided to a loyalty computing system associated with the merchant 12. Some implementations can offer a one to one relationship between a particular level of consent and a particular incentive. Other implementations can offer a plurality of different incentives for a particular scope of consent and allow the account holder to select from the group. Other implementations can offer a plurality of different scopes of consent for a particular incentive and allow the account holder to select from the group. As is to be appreciated, the presentation of the transaction data capture request and any associated incentives can vary.

As schematically illustrated in FIG. 1, an analytics engine 40 can be configured to seek consent 32 from the account holder 24 in response to transaction data capture consent request. The analytics engine 40 can be comprised of one or more computing devices that comprise one or more processors and one or more memory units. In some embodiments, the analytics engine 40 comprises an incentive database 42. The incentive database 42 can store various incentives to offer the account holder 24 in exchange for the account holder's consent 32. The incentives stored in the incentive database can be provided by, or at least selected by, the merchant 12 or any other entity, such as the issuing financial institution 18, for example. Upon receiving the consent 32 from the account holder 24, transaction data associated with the transaction event and based on a level of consent received from the account holder 24 can be stored in the transaction database 44.

The particular granularity of the data stored for a particular account holder 24 can vary based on, for example, the level of consent obtained from the account holder 24. In this regard, for a particular account holder 24, the transaction database 44 can store transaction data only related to the merchant 12, or across a number of merchants, as determined by the level of consent provided by the account holder 24. The transaction data within the transaction database 44 can be purged after a time period associated with the transaction data has expired. Accordingly, the transaction data within the transaction database 44 can be time stamped to facilitate purging at certain time frames. In one embodiment, transaction data is stored within the transaction database 44 as individual transaction records that each of an assigned expiration date. At routine intervals (such as daily or weekly, for example) the analytics engine 40 steps through the transaction database 44 and purges any transaction record that are expired.

The analytics engine 40 can also include a portal 46 for providing access to the transaction database 44 to data recipients, such as the merchant 12. As is to be appreciated by those skilled in the art, the portal 46 can be facilitated through any suitable communication techniques, such a web server and/or an application server. A portal 46 hosted by an application server can allow recipients to view various transaction records stored in the transaction database 44 through a specialized application installed on a recipient computing device. A portal 46 hosted by a web server can allow for recipients to view the transaction data of the transaction database 44 via a web browser. Credentials of the recipient can be required by the analytics engine 40 before giving access to the portal 46. The analytics engine 40 can also use the credentials to establish the identity of the entity seeking the transaction data such that only certain records will be served to the recipient. In some embodiments, the transaction database 44 is part of the larger database maintained by the acquirer processor 16 for its own settlement and financial recordkeeping. In other embodiments, the transaction database 44 is distinct from any databases maintained by the acquirer processor 16 for settlement and financial recordkeeping. Further, it is noted that should the account holder 24 not provide consent, even though transaction data may still be stored by the acquirer processor 16 during the processing of the transaction for settlement and financial recordkeeping. Such information, however, may be referred to as restricted transaction data as data collection entities would not have access to such information through the portal 46.

Figure 2:
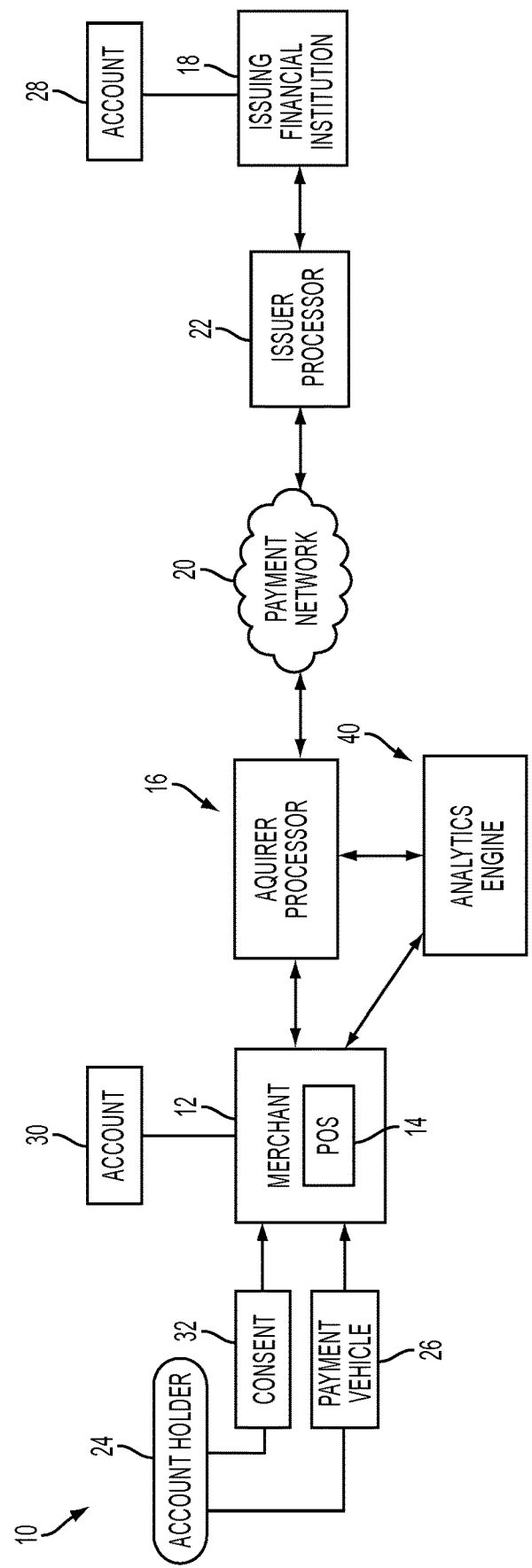
FIG. 2 depicts another embodiment of the system shown in FIG. 1.

While FIG. 1 depicts the analytics engine 40 and it associated functionality being an extension, or otherwise affiliated, of the functionality offered by the acquirer processor 16, other configurations may be used. FIG. 2, for example, depicts another embodiment of the system 10. The system of FIG. 2 differs from the system of FIG. 1 in that POS device 14 is configured to communicate with the analytics engine 40 independent of communications to the acquirer processor 16. Such communications to the analytics engine 40 can be facilitated through a variety of communication techniques, such as web-based calls, and so forth. In some implementations, these communications occur before communications with the acquirer processor 16. Responsive to the communications with the analytics engine 40, the POS device 14 can present an incentive-consent matrix to the account holder 24 for consideration. The particular incentive-consent matrix provided to the POS device 14 can depend on the identity of the merchant 12, as may be conveyed through the communications between the POS device 14 and the analytics engine 40. Upon receiving a selection of a level of consent from the account holder 24 at the POS device 14, the selection can be provided to the analytics engine 40 for processing. An associated incentive can then be provided to the account holder, such as via the POS device 14. In one embodiment, the incentive is applied to the transaction such that the subsequent communications with the acquirer processor 16 seek authorization for a reduced amount of funds. By way of example, the account holder 24 may be making a purchase for $10.00 at the merchant 12. The account holder 24 consents to a particular level of consent that is incentivized by an instant coupon for 10% off the purchase amount. The POS device 14 applies the 10% off coupon to the sales price and then sends and authorization message for $9.00 to the acquirer processor 16.

Still referring to FIG. 2 after consent has been received from the account holder 24, the transaction data can be stored in one or more locations within the system 10. In one embodiment, the transaction data is stored within a transaction data database 44 of the analytics engine 40, similar to FIG. 1. The transaction data can be received by the analytics engine 40 from various sources, such as the POS device 14, the merchant 12, the acquirer processor 16, and so on, through a data portal. In one embodiment, such transaction data is provided to the analytics engine 40 through an application programing interface (API). Alternatively or additionally, the transaction data can be stored by the acquirer processor 16, which is also in communication with the POS device 14. In such implementations, the acquirer processor 16 can comprise a portal (similar to the portal 46 of FIG. 1) to allow recipients to access the transaction data.

Figures 3, 4:
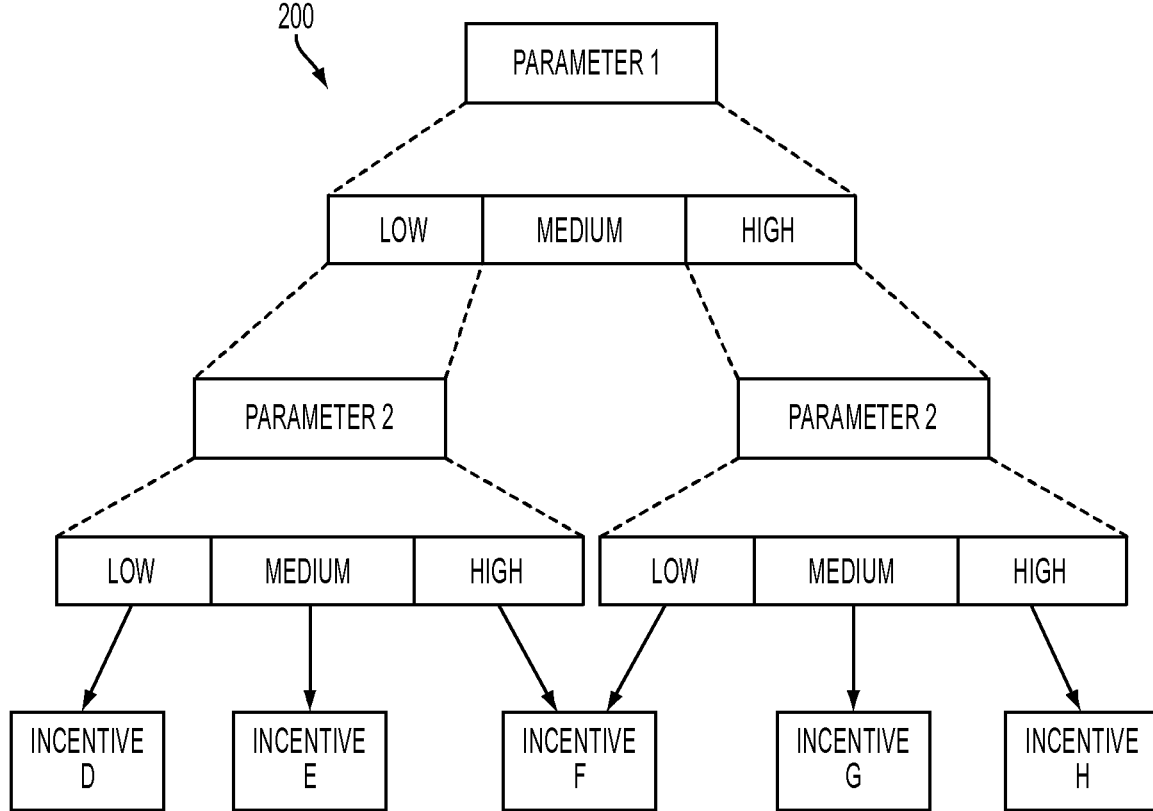
FIG. 3 schematically depicts an example incentive-consent matrix.
FIG. 4 schematically depicts another format for an incentive-consent matrix.

The incentive-consent matrix can be presented to the account holder 24 in a variety of formats, all of which are intended to be within the scope of the present disclosure. FIG. 3 schematically depicts an example incentive-consent matrix 100. Each level of consent, shown as consent level A, consent level B, and consent level C, is associated with a particular incentive, shown as incentive A, incentive B, and incentive C. The scope of the consent may increase from consent level A to C. Examples of increase in scope include increase of duration of the consent, increase in the amount of transaction data that the account holder allows to be accessed by a recipient of the transaction data, and/or an increase in the number or type of entities that can access the transaction data. The relative value of the incentives can also increase from incentive A to C. While the particular incentive offers will vary based on implementation, in one embodiment incentive A is a 2% discount off a purchase amount, incentive B is a 4% discount off a purchase amount, and incentive C is a 6% discount off a purchase amount. Other types of incentives can include, without limitation, coupons, buy-one-get-one-free offers, membership offers, product offerings, and gift card offerings. Some types of incentives can be configured to be applied in real-time such that they apply to the transaction event occurring at the POS device. In this regard, an account holder realizes an "instant" benefit for providing consent. Some types of incentives, however, can be configured to be used by the account holder for a subsequent transaction event or other type of event. Some types of incentives may be provided to the account holder by the merchant, such as "free gift" for offering consent. In some case, particular consent levels do not have an associated incentive.

Still referring to FIG. 2, in one embodiment, the consent levels (A, B, C) can first be displayed to the account holder, such as via a display on the POS device 14 (FIG. 1), and once the account holder selects a level, the corresponding incentive (A, B, C) is then displayed. In one embodiment, the consent levels (A, B, C) can first displayed along with the corresponding incentive (A, B, C) to the account holder, such as via a display on the POS device 14 (FIG. 1). In one embodiment, the incentives (A, B, C) can first be displayed to the account holder, and once the account holder selects an incentive, the consent level (A, B, C) is displayed.

FIG. 4 schematically depicts another format for an incentive-consent matrix. The incentive-consent matrix 200 can be presented to an account holder in a staged format, such that the account holder selects, or "builds", their desired scope of consent based on various consent parameters. In the illustrated embodiment, parameter 1 is first presented to the account holder. Parameter 1 can relate to, for example, a duration of consent or other type of consent parameter. The account holder is presented with three levels of consent for that particular parameter, shown as "low", "medium", and "high." Other embodiments can use different numbers of levels or selection options. After making the selection, the account holder is presented with parameter 2. Parameter 2 can relate to, for example, an amount of transaction data that may be stored or a number of entities that will have access to the data. The account holder can then select a level of consent related to that particular parameter. Additional parameters can then be presented to the account holder for consideration. In the illustrated embodiment, depending on the level of consent provided for parameters 1 and 2, an incentive is provided to the account holder (shown as incentives D-H). The relative value of the incentives can vary. In some cases, incentive D may be relatively less valuable than incentive H. Furthermore, the incentive-consent matrix can be configured to offer the same incentive to various "paths" through the incentive-consent matrix. As shown, account holders that select a low level for parameter 1 and high level for parameter 2 are provided with the same incentive (incentive F) as account holders that select a high level for parameter 1 and low level for parameter 2.

While FIGS. 3 and 4 illustrate example configurations for an incentive-consent matrix, it is to be appreciated by those skilled in the art that any suitable configurations can be used without departing from the scope of the present disclosure. Further, incentive-consent matrices can vary merchant to merchant, or even transaction to transaction at a particular merchant.

Depending on the particular configuration of the POS device (i.e., physical POS device or a virtual POS device) and any associated sales terminals or computing systems, the consent levels and incentive levels may be conveyed to the account holder using other techniques. For example, for web-based POS devices, the consent levels and corresponding incentives can be displayed to the account holder via a web interface. In certain embodiments, the consent levels and corresponding incentives can be displayed on a sales terminal or customer service computing system at the merchant location. A sales associate interacting with the sales terminal or customer service computing system can then prompt the account holder for a selection.

Figure 5:
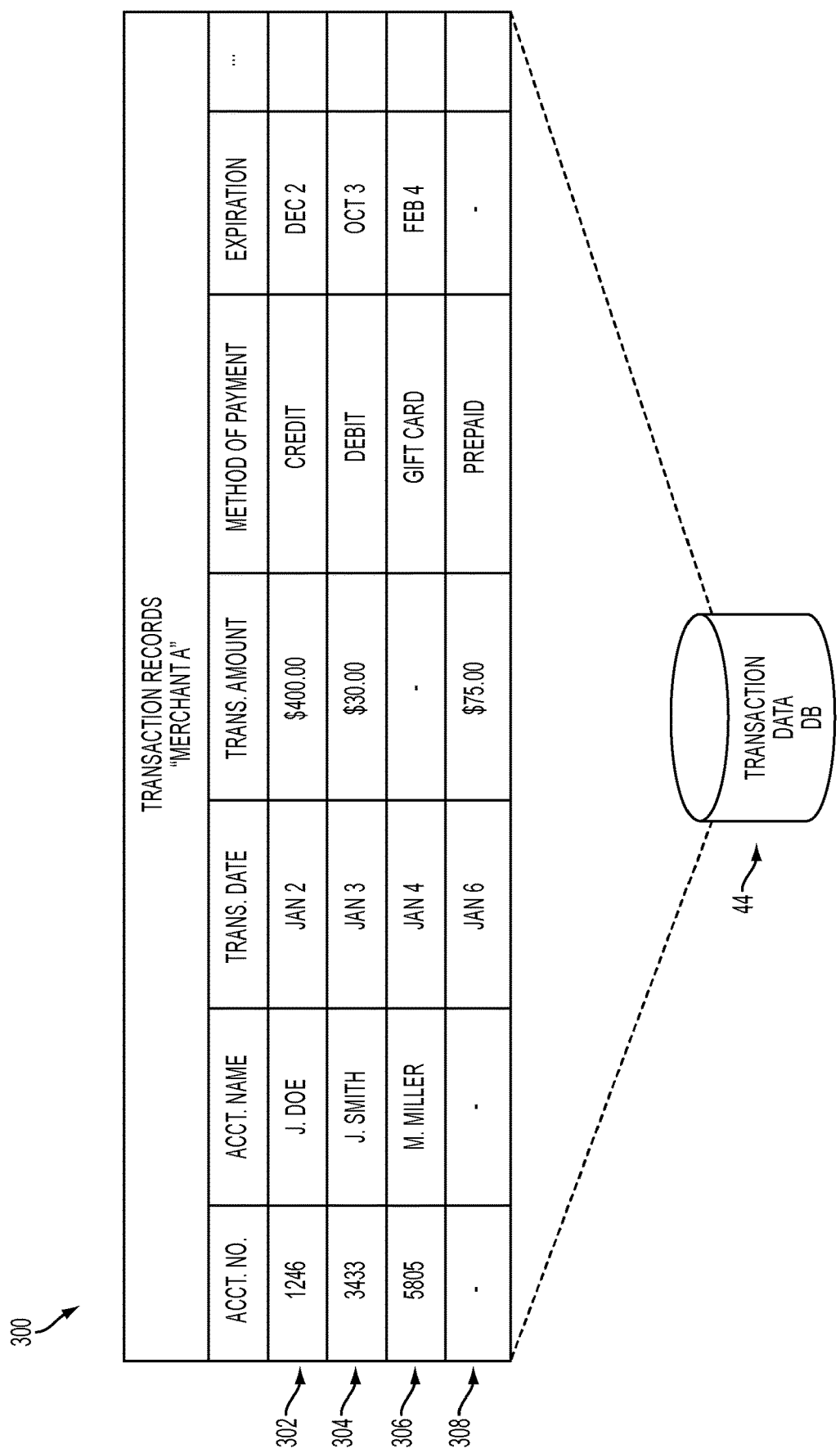
FIG. 5 is a schematic representation of a collection of example transaction records stored within a transaction data database.

Based on the data storage techniques used by the acquirer processor, or other entities receiving transaction data in accordance with the systems and methods disclosed herein, the particular database schema can vary. FIG. 5 is a schematic representation of an example transaction records 300 stored within the transaction data database 44 (FIG. 1) for the merchant A, which can be the merchant 12 shown in FIG. 1. The transaction records 300 can comprises various transaction data. As illustrated, example data includes an account number, account name, a transaction date, a transaction amount, a method of payment and an expiration date. As it to be readily appreciated, a wide variety of additional data can additionally or alternatively be stored within the transaction records 300. FIG. 5 illustrates that each record can comprises varying amounts of transaction data, as determined by a level of consent obtained from the account holder. In particular, the transaction records 300 in FIG. 5 decrease in relative scope, as transaction record 302 holds the most information and transaction record 308 holds the least amount of information. As shown, some of the records are associated with an expiration date. The particular expiration date for the transaction record can be based on a temporal duration that the associated account holder agreed to while interacting with the analytics engine (i.e., via a POS device). Not every record is necessarily associated with an expiration date. The transaction record 308, for example, does not have an expiration date. This particular record also only holds a relatively limited amount of information (transaction date and transaction amount) and does not identify the account holder.

Figure 6:
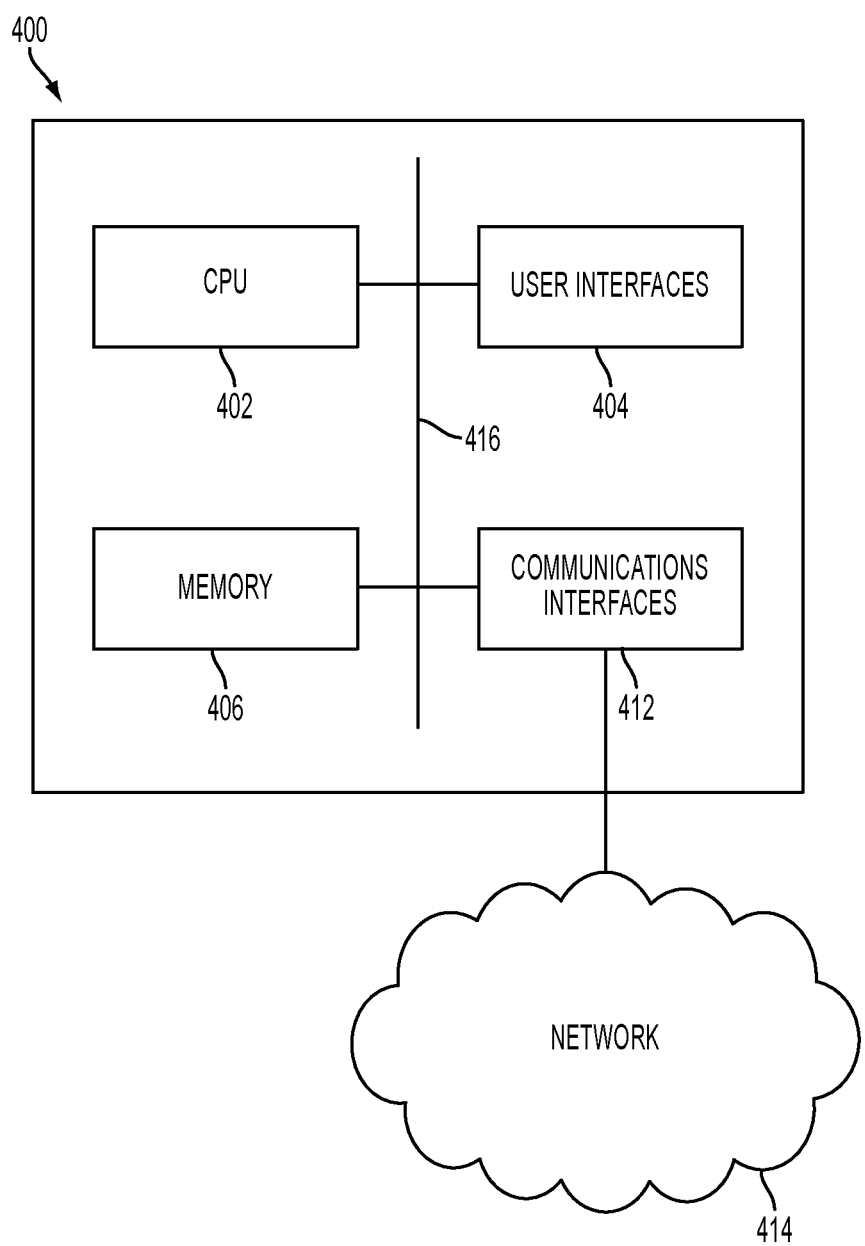
FIG. 6 depicts an example computing device.

The processes described herein can be performed on or between one or more computing devices. Referring now to FIG. 6, an example computing device 400 is presented. A computing device 400 can be a server, a computing device that is integrated with other systems or subsystems, a mobile computing device, a cloud-based computing capability, and so forth. The computing device 400 can be any suitable computing device as would be understood in the art, including without limitation, a custom chip, an embedded processing device, a tablet computing device, a point of sale terminal 112, a back office system 114, a personal data assistant (PDA), a desktop, a laptop, a microcomputer, a minicomputer, a server, a mainframe, or any other suitable programmable device. In various embodiments disclosed herein, a single component can be replaced by multiple components and multiple components can be replaced by a single component to perform a given function or functions. Except where such substitution would not be operative, such substitution is within the intended scope of the embodiments.

The computing device 400 includes a processor 402 that can be any suitable type of processing unit, for example a general purpose central processing unit (CPU), a reduced instruction set computer (RISC), a processor that has a pipeline or multiple processing capability including having multiple cores, a complex instruction set computer (CISC), a digital signal processor (DSP), an application specific integrated circuits (ASIC), a programmable logic devices (PLD), and a field programmable gate array (FPGA), among others. The computing resources can also include distributed computing devices, cloud computing resources, and virtual computing resources in general.

The computing device 400 also includes one or more memories 406, for example read only memory (ROM), random access memory (RAM), cache memory associated with the processor 402, or other memories such as dynamic RAM (DRAM), static ram (SRAM), programmable ROM (PROM), electrically erasable PROM (EEPROM), flash memory, a removable memory card or disk, a solid state drive, and so forth. The computing device 400 also includes storage media such as a storage device that can be configured to have multiple modules, such as magnetic disk drives, floppy drives, tape drives, hard drives, optical drives and media, magneto-optical drives and media, compact disk drives, Compact Disk Read Only Memory (CD-ROM), Compact Disk Recordable (CD-R), Compact Disk Rewriteable (CD-RW), a suitable type of Digital Versatile Disk (DVD) or BluRay disk, and so forth. Storage media such as flash drives, solid state hard drives, redundant array of individual disks (RAID), virtual drives, networked drives and other memory means including storage media on the processor 402, or memories 406 are also contemplated as storage devices. It can be appreciated that such memory can be internal or external with respect to operation of the disclosed embodiments. It can be appreciated that certain portions of the processes described herein can be performed using instructions stored on a computer-readable medium or media that direct a computer system to perform the process steps. Non-transitory computer-readable media, as used herein, comprises all computer-readable media except for transitory, propagating signals.

Network and communication interfaces 412 can be configured to transmit to, or receive data from, other computing devices 400 across a network 414. The network and communication interfaces 412 can be an Ethernet interface, a radio interface, a Universal Serial Bus (USB) interface, or any other suitable communications interface and can include receivers, transmitter, and transceivers. For purposes of clarity, a transceiver can be referred to as a receiver or a transmitter when referring to only the input or only the output functionality of the transceiver. Example communication interfaces 412 can include wired data transmission links such as Ethernet and TCP/IP. The communication interfaces 412 can include wireless protocols for interfacing with private or public networks 414. For example, the network and communication interfaces 412 and protocols can include interfaces for communicating with private wireless networks such as a WiFi network, one of the IEEE 802.11x family of networks, or another suitable wireless network. The network and communication interfaces 412 can include interfaces and protocols for communicating with public wireless networks 412, using for example wireless protocols used by cellular network providers, including Code Division Multiple Access (CDMA) and Global System for Mobile Communications (GSM). A computing device 400 can use network and communication interfaces 412 to communicate with hardware modules such as a database or data store, or one or more servers or other networked computing resources. Data can be encrypted or protected from unauthorized access.

In various configurations, the computing device 400 can include a system bus 416 for interconnecting the various components of the computing device 400, or the computing device 400 can be integrated into one or more chips such as programmable logic device or application specific integrated circuit (ASIC). The system bus 416 can include a memory controller, a local bus, or a peripheral bus for supporting input and output devices 404, and communication interfaces 412. Example input and output devices 404 include keyboards, keypads, gesture or graphical input devices, motion input devices, touchscreen interfaces, one or more displays, audio units, voice recognition units, vibratory devices, computer mice, and any other suitable user interface.

The processor 402 and memory 406 can include nonvolatile memory for storing computer-readable instructions, data, data structures, program modules, code, microcode, and other software components for storing the computer-readable instructions in non-transitory computer-readable mediums in connection with the other hardware components for carrying out the methodologies described herein. Software components can include source code, compiled code, interpreted code, executable code, static code, dynamic code, encrypted code, or any other suitable type of code or computer instructions implemented using any suitable high-level, low-level, object-oriented, visual, compiled, or interpreted programming language.

Figure 7:
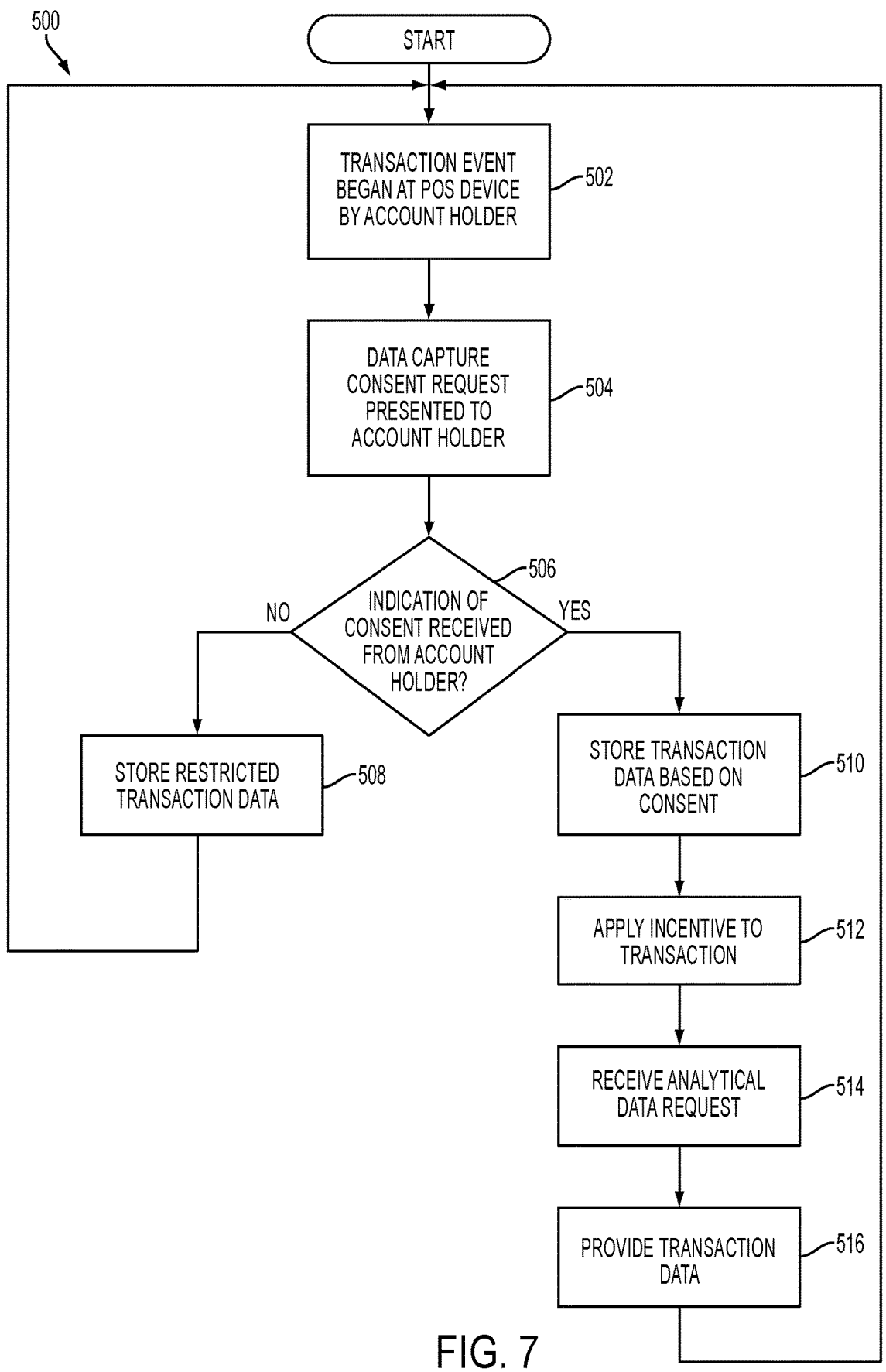
FIG. 7 depicts an example process flow in accordance with one non-limiting embodiment.

FIG. 7 depicts an example process flow 500 in accordance with one non-limiting embodiment. At 502, a transaction event is begun at a POS device by an account holder. The POS device can be any device, or collection of devices, configured to receive information regarding a payment vehicle and generate the appropriate messaging or communications to seek authorization of payment. At 504, a data capture consent request is presented to the account holder. The data capture consent request can be, for example, displayed on a graphical interface of the POS device or otherwise conveyed to the account holder, either visually or orally. The data capture consent request can comprise varying levels of consent or can be expressed in an "opt-in" or "opt-out" format. In some embodiments, the data capture consent request is presented in the format of an incentive-consent matrix, as described above. The data capture consent request can originate at the POS device or any other affiliated entity, such as an acquirer processor configured to receive communications from the POS device. At 506 it is determined if an indication of consent is received from the account holder. The indication of consent may be based on the account holder's interaction with the POS device (i.e., pressing a "yes" or "no" button). In some implementations, the account holder provides a sales clerk with an oral indication of consent, and the sales clerk interacts with the POS device, or associated terminal, to provide the indication of consent.

If the account holder does not consent to the data capture request, restricted transaction data is stored at 508. Generally, restricted transaction data is data that is not readily usable or available to third parties, such as merchants, and may comprise personally identifiable information, and so forth. If the account holder does consent to the data capture request, transaction data is stored at 510. The transaction data can be stored in a database associated with an acquirer processor, in a database associated with an analytics engine, or a database associated with any other affiliated entity. At 512, an incentive is applied to the transaction. The incentive can be, for example, a coupon or other type of offering provided to the account holder in exchange for providing the indication of consent. Additional transaction events may occur over time with additional transaction data being added to the appropriate database. At 514, an analytical data request is received. The analytical data request may originate, for example, from a merchant through a portal. At 516, transaction data is provided to the merchant (or other recipient). In some embodiments, the transaction data is segmented, or otherwise processed, before it is provided to the recipient. In some embodiments, the transaction data is provided in a data file. In other embodiments, the transaction data is provided through a web-based online dashboard or a specialized software application or platform.

Figure 8:
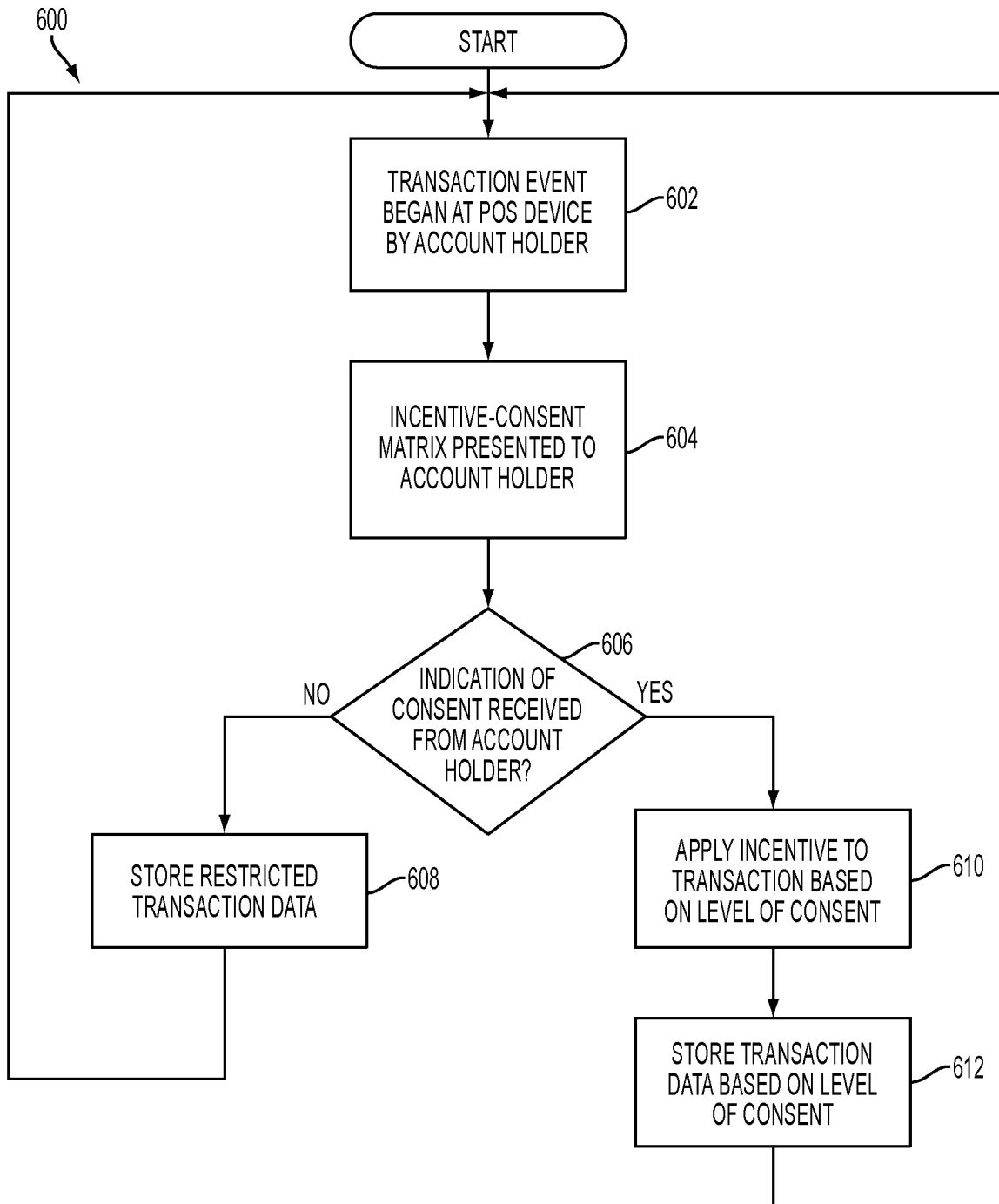
FIG. 8 depicts an example process flow in accordance with one non-limiting embodiment.

FIG. 8 depicts an example process flow 600 in accordance with one non-limiting embodiment. At 602, a transaction event is begun at a POS device by an account holder. The POS device can be any device, or collection of devices, configured to receive information regarding a payment vehicle and generate the appropriate messaging or communications to seek authorization of payment. At 604, an incentive-consent matrix is presented to the account holder. The incentive-consent matrix can be, for example, displayed on a graphical interface of the POS device or otherwise conveyed to the account holder, either visually or orally. At 606 it is determined if an indication of consent is received from the account holder. The indication of consent may be based on the account holder's interaction with the POS device (i.e., pressing a "yes" or "no" button) or navigating through a series of screens and selecting various options, for example. In some implementations, the account holder provides a sales clerk with an oral indication of consent, and the sales clerk interacts with the POS device, or associated terminal, to provide the indication of consent.

If the account holder does not consent to the data capture request, restricted transaction data is stored at 608. If the account holder does consent to the data capture request, an incentive based on the level of consent is applied to the transaction at 610. Transaction data is stored at 612. The transaction data can be stored in a database associated with an acquirer processor, in a database associated with an analytics engine, or a database associated with any other suitable entity. Similar to previously described embodiments, transaction data can be provided to a merchant (or other recipient) using any suitable delivery technique.

Figure 9:
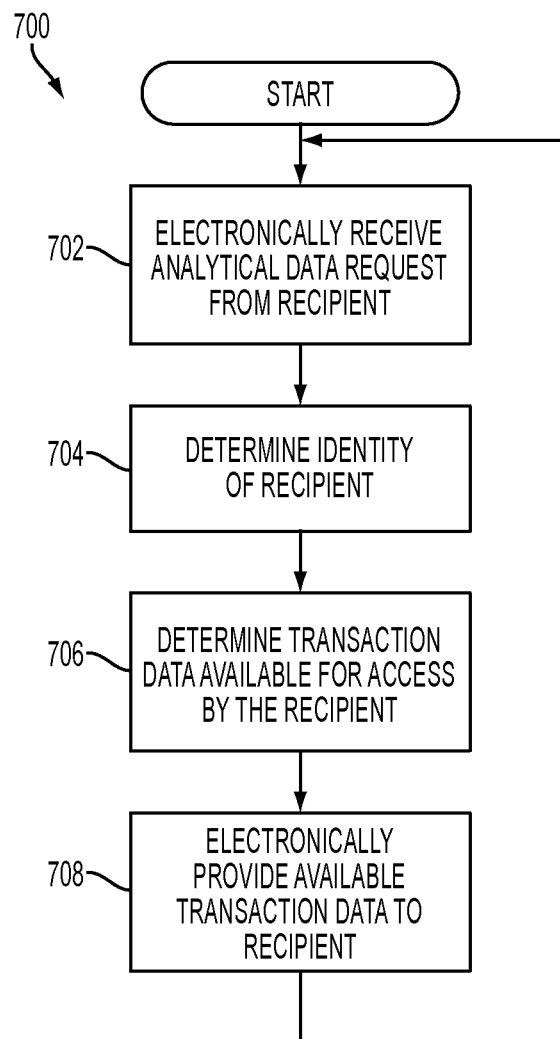
FIG. 9 depicts an example process flow in accordance with one non-limiting embodiment.

FIG. 9 depicts an example process flow 700 in accordance with one non-limiting embodiment. The process flow 700 depicts an example interaction with a portal of an analytics engine, which may a component of an acquirer processor, as described above. At 702, an analytical data request is electronically received from a recipient. Such data request may be received via interactions with a web-based dashboard, an application programming interface, a specialized software platform, or other interaction technique. At 704, the identity of the potential recipient of transaction data is determined. In some embodiment, log in credentials are used. Additional or alternative techniques for determining identity can be used, such as API keys. At 706, it is determined if transaction data is available for access by the recipient. If transaction data is available, the transaction data is electronically provided to the recipient at 708.

It is to be understood that the figures and descriptions of the present invention have been simplified to illustrate elements that are relevant for a clear understanding of the present invention, while eliminating, for purposes of clarity, other elements. Those of ordinary skill in the art will recognize, however, that these sorts of focused discussions would not facilitate a better understanding of the present invention, and therefore, a more detailed description of such elements is not provided herein.

Any element expressed herein as a means for performing a specified function is intended to encompass any way of performing that function including, for example, a combination of elements that performs that function. Furthermore the invention, as may be defined by such means-plus-function claims, resides in the fact that the functionalities provided by the various recited means are combined and brought together in a manner as defined by the appended claims. Therefore, any means that can provide such functionalities may be considered equivalents to the means shown herein. Moreover, the processes associated with the present embodiments may be executed by programmable equipment, such as computers. Software or other sets of instructions that may be employed to cause programmable equipment to execute the processes may be stored in any storage device, such as, for example, a computer system (nonvolatile) memory, an optical disk, magnetic tape, or magnetic disk. Furthermore, some of the processes may be programmed when the computer system is manufactured or via a computer-readable memory medium.

It can also be appreciated that certain process aspects described herein may be performed using instructions stored on a computer-readable memory medium or media that direct a computer or computer system to perform process steps. A computer-readable medium may include, for example, memory devices such as diskettes, compact discs of both read-only and read/write varieties, optical disk drives, and hard disk drives. A non-transitory computer-readable medium may also include memory storage that may be physical, virtual, permanent, temporary, semi-permanent and/or semi-temporary.

These and other embodiments of the systems and methods can be used as would be recognized by those skilled in the art. The above descriptions of various systems and methods are intended to illustrate specific examples and describe certain ways of making and using the systems disclosed and described here. These descriptions are neither intended to be nor should be taken as an exhaustive list of the possible ways in which these systems can be made and used. A number of modifications, including substitutions of systems between or among examples and variations among combinations can be made. Those modifications and variations should be apparent to those of ordinary skill in this area after having read this disclosure.

What is claimed is:

1. A computer-implemented method, comprising:

determining, by one or more computing devices associated with an acquirer processor, that an account holder associated with a payment vehicle account is initiating a payment transaction at a point of sale device that is associated with a merchant;

providing, by the one or more computing devices associated with the acquirer processor and in response to initiating the payment transaction, a transaction data capture consent request for display on a graphical user interface of the point of sale device, wherein the transaction data capture consent request comprises a graphical representation of a plurality of incentives associated with the merchant and a graphical representation of a plurality of scopes of consent presented as an incentive-consent matrix;

automatically updating, by the one or more computing devices associated with the acquirer processor, the graphical representation of the plurality of incentives and the graphical representation of the plurality of scopes of consent in the graphical user interface in real-time as input from the account holder is received in the graphical user interface;

receiving, by the one or more computing devices associated with the acquirer processor, transaction data corresponding to the payment transaction, an indication of consent from the account holder associated with the payment vehicle account via the input received in the graphical user interface, a selection of a defined consent time period from the account holder after which the consent is revoked via the input received in the graphical user interface, and a selection of a defined data scope from the account holder, via the input received in the graphical user interface, which identifies an amount of the received transaction data that may be stored, and a recipient, or type of recipient, that may have access to the transaction data;

altering the received transaction data by applying at least one of the plurality of incentives to the payment transaction based on a scope corresponding to the defined consent time period and the defined data scope;

writing, to a transaction data database in electronic communication with the one or more computing devices associated with the acquirer processor, the altered transaction data in a transaction record including the selected defined consent time period and the amount of the received transaction data based on the defined data scope;

determining an identity of the recipient based on an application programming interface (API) key associated with the recipient;

determining that the recipient is permitted to access the altered transaction data based on the determined identity;

in response to determining that the recipient is permitted to access the altered transaction data, providing the altered transaction data to the recipient; and purging, or restricting access of the recipient to, by the one or more computing devices associated with the acquirer processor, the transaction record from the transaction data database at an expiration date based on a temporal duration of the selected defined consent time period.

2. The computer-implemented method of claim 1, wherein at least one of the plurality of incentives is a coupon.

3. The computer-implemented method of claim 1, wherein the payment transaction is provided to the recipient as a data file.

4. The computer-implemented method of claim 1, wherein the payment transaction is provided to the recipient via a graphical user interface accessible by the recipient.

5. The computer-implemented method of claim 4, comprising:
issuing, to the recipient, credentials to access the graphical user interface.

6. The computer-implemented method of claim 1, wherein the transaction data comprises any of a transaction amount, a method of payment, a transaction date, and an account holder name.

7. The computer-implemented method of claim 1, wherein a value of the plurality of incentives increases as a corresponding scope from the plurality of scopes of consent increases.

8. A device associated with an acquirer processor, the device comprising:
a memory configured to store instructions; and
one or more processors configured to execute the instructions to perform operations comprising:
determining that an account holder associated with a payment vehicle account is initiating a payment transaction at a point of sale device that is associated with a merchant;
providing, in response to initiating the payment transaction, a transaction data capture consent request for display on a graphical user interface of the point of sale device, wherein the transaction data capture consent request comprises a graphical representation of a plurality of incentives associated with the merchant and a graphical representation of a plurality of scopes of consent presented as an incentive-consent matrix;
automatically updating the graphical representation of the plurality of incentives and the graphical representation of the plurality of scopes of consent in the graphical user interface in real-time as input from the account holder is received in the graphical user interface;
receiving transaction data corresponding to the payment transaction, an indication of consent from the account holder associated with the payment vehicle account via the input received in the graphical user interface, a selection of a defined consent time period from the account holder after which the consent is revoked via the input received in the graphical user interface, and a selection of a defined data scope from the account holder, via the input received in the graphical user interface, which identifies an amount of the received transaction data that may be stored, and a recipient, or type of recipient, that may have access to the transaction data;
altering the received transaction data by applying at least one of the plurality of incentives to the payment transaction based on a scope corresponding to the defined consent time period and the defined data scope;
writing, to a transaction data database, the altered transaction data in a transaction record including the selected defined consent time period and the amount of the received transaction data based on the defined data scope;
determining an identity of the recipient based on an application programming interface (API) key associated with the recipient;
determining that the recipient is permitted to access the altered transaction data based on the determined identity;
in response to determining that the recipient is permitted to access the altered transaction data, providing the altered transaction data to the recipient; and
purging, or restricting access of the recipient to, the transaction record from the transaction data database at an expiration date based on a temporal duration of the selected defined consent time period.

9. The device of claim 8, wherein at least one of the plurality of incentives is a coupon.

10. The device of claim 8, wherein the payment transaction is provided to the recipient as a data file.

11. The device of claim 8, wherein the payment transaction is provided to the recipient via a graphical user interface accessible by the recipient.

12. The device of claim 11, wherein the operations further comprise:
issuing, to the recipient, credentials to access the graphical user interface.

13. The device of claim 8, wherein the transaction data comprises any of a transaction amount, a method of payment, a transaction date, and an account holder name.

14. The device of claim 8, wherein a value of the plurality of incentives increases as a corresponding scope from the plurality of scopes of consent increases.

15. A non-transitory computer-readable medium storing instructions that, when executed by one or more processors of a device associated with an acquirer processor, cause the one or more processors to perform operations comprising:
determining that an account holder associated with a payment vehicle account is initiating a payment transaction at a point of sale device that is associated with a merchant;
providing, in response to initiating the payment transaction, a transaction data capture consent request for display on a graphical user interface of the point of sale device, wherein the transaction data capture consent request comprises a graphical representation of a plurality of incentives associated with the merchant and a graphical representation of a plurality of scopes of consent presented as an incentive-consent matrix;
automatically updating the graphical representation of the plurality of incentives and the graphical representation of the plurality of scopes of consent in the graphical user interface in real-time as input from the account holder is received in the graphical user interface;
receiving transaction data corresponding to the payment transaction, an indication of consent from the account holder associated with the payment vehicle account via the input received in the graphical user interface, a selection of a defined consent time period from the account holder after which the consent is revoked via the input received in the graphical user interface, and a selection of a defined data scope from the account holder, via the input received in the graphical user interface, which identifies an amount of the received transaction data that may be stored, and a recipient, or type of recipient, that may have access to the transaction data;

altering the received transaction data by applying at least one of the plurality of incentives to the payment transaction based on a scope corresponding to the defined consent time period and the defined data scope;

writing, to a transaction data database, the altered transaction data in a transaction record including the selected defined consent time period and the amount of the received transaction data based on the defined data scope;

determining an identity of the recipient based on an application programming interface (API) key associated with the recipient;

determining that the recipient is permitted to access the altered transaction data based on the determined identity;

in response to determining that the recipient is permitted to access the altered transaction data, providing the altered transaction data to the recipient; and purging, or restricting access of the recipient to, the transaction record from the transaction data database at an expiration date based on a temporal duration of the selected defined consent time period.

16. The non-transitory computer-readable medium of claim 15, wherein at least one of the plurality of incentives is a coupon.

17. The non-transitory computer-readable medium of claim 15, wherein the payment transaction is provided to the recipient as a data file.

18. The non-transitory computer-readable medium of claim 15, wherein the payment transaction is provided to the recipient via a graphical user interface accessible by the recipient.

19. The non-transitory computer-readable medium of claim 18, wherein the operations further comprise:
issuing, to the recipient, credentials to access the graphical user interface.

20. The non-transitory computer-readable medium of claim 15, wherein the transaction data comprises any of a transaction amount, a method of payment, a transaction date, and an account holder name.

* * * * *